C. F. LEFEVER.
AIR GUN BARREL AND METHOD OF FORMING THE SAME.
APPLICATION FILED DEC. 27, 1915.
1,180,859.
Patented Apr. 25, 1916.
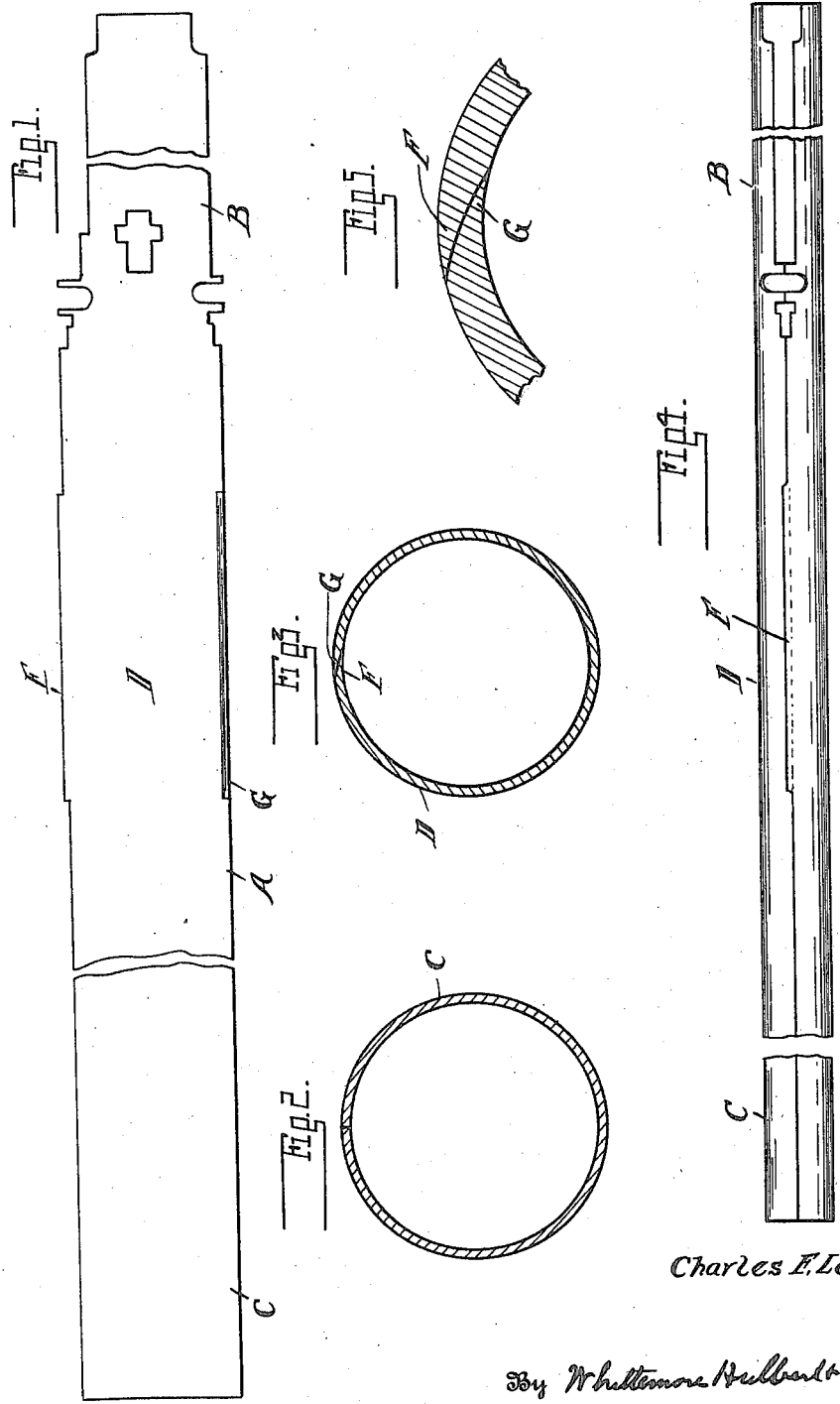

UNITED STATES PATENT OFFICE.

CHARLES F. LEFEVER, OF PLYMOUTH, MICHIGAN, ASSIGNOR TO DAISY MANUFACTURING COMPANY, OF PLYMOUTH, MICHIGAN, A CORPORATION OF MICHIGAN.

AIR-GUN BARREL AND METHOD OF FORMING THE SAME.

1,180,859.  Specification of Letters Patent. Patented Apr. 25, 1916.

Application filed December 27, 1915. Serial No. 68,715.

*To all whom it may concern:*

Be it known that I, CHARLES F. LEFEVER, a citizen of the United States of America, residing at Plymouth, in the county of Wayne and State of Michigan, have invented certain new and useful Improvements in Air-Gun Barrels and Methods of Forming the Same, of which the following is a specification, reference being had thereto in the accompanying drawings.

The invention relates to the manufacture of air guns, and it is the object of the invention to simplify the construction and reduce the cost of manufacture.

In the present state of the art it is usual to provide air guns with a false barrel formed of a sheet-metal blank with butted edges, and to arrange within this false barrel an air cylinder formed of seamless welded or soldered tubing, and this inner air cylinder is necessitated by the fact that the false barrel is not air-tight and cannot be made air-tight without soldering or welding together the butting edges. Soldering is not permissible for the reason that in forming an oxidized finish on the barrel it is heated to a higher temperature than the melting point of the solder. On the other hand, welding of the barrel is an expensive operation.

With the present invention I have avoided the necessity of a separate air cylinder without either the use of solder or forming the entire false barrel of seamless or welded tubing. This is accomplished by forming the barrel from a sheet-metal blank having butting edges for the greater portion of its length, but provided with a welded seam for a short portion to produce an air-tight cylinder.

In the drawings: Figure 1 is a plan of the blank from which my tube is formed; Fig. 2 is an enlarged cross section of the formed tube, showing the portion having butted edges; Fig. 3 is a similar view through the welded portion of the tube; Fig. 4 is an elevation of the completed barrel; and Fig. 5 is an enlarged view showing the overlapping joint.

A is a sheet-metal blank, preferably sheet steel, which is of a length corresponding with the barrel and of a width suitable for the formation of a tube of the desired diameter.

B is a portion of the barrel suitably cut away and fashioned for the formation of the engagement means with the stock and portion of the mechanism. C is a portion at the opposite end of the blank, and D is an intermediate portion suitably positioned for the air cylinder. The edges of the portion C are preferably straight and adapted to be butted against each other, as shown in Fig. 2, but the edges of the portion D are preferably fashioned to form an overlapping joint. Preferably one of the edges F of the portion D projects beyond the line of the edge of the portion A and is beveled, while the opposite edge G is reversely beveled to receive said projecting portion.

The blank formed as described is bent into a cylinder with the edges of the portion A abutting, while the projecting beveled edge F of the portion D overlaps the reversely beveled edge thereof. These overlapping edges are then welded, preferably electrically, and will thus form a flush joint both inside and outside the barrel.

With a barrel constructed as described, the welded section will form an air-tight cylinder, which is as serviceable as a seamless tube, while the remaining portions of the barrel have merely butted edges. The length of the welded portion is relatively slight in comparison with the entire length of the barrel, and consequently a considerable saving in cost is effected over a construction in which the entire barrel has a welded joint.

What I claim as my invention is:—

1. The method of forming gun barrels, comprising the cutting of a blank with a portion of its length fashioned for abutting the edges thereof and another portion fashioned to overlap, forming said blank into a cylinder and welding the overlapping portions.

2. The method of forming gun barrels, comprising the cutting of a blank with an edge thereof for a portion of the length projecting beyond the edge of another portion, forming said blank into a cylindrical barrel with the projecting edge portions overlapping and the other edges abutting, and welding the overlapping edges.

3. A gun-barrel, comprising a continuous barrel formed of a single sheet-metal blank having a portion of its length formed with butting edges and another portion with overlapping and welded edge portions forming flush surfaces.

4. The method of forming gun barrels, comprising cutting of a blank with an edge thereof for a portion of the length projecting beyond the edge of another portion, said projecting edge being beveled and the opposite edge of the blank being reversely beveled, forming said blank into a cylindrical barrel with the beveled portions overlapping, and welding the overlapping portions.

5. A gun barrel, comprising a continuous barrel formed of a single sheet metal blank having a portion of its length formed with butting edges and another portion with overlapping beveled edges welded together to form flush outer and inner surfaces.

In testimony whereof I affix my signature in presence of two witnesses.

CHARLES F. LEFEVER.

Witnesses:
JAMES P. BARRY,
PHYLLIS COBURN.